(12) United States Patent
Shan et al.

(10) Patent No.: US 10,057,201 B2
(45) Date of Patent: *Aug. 21, 2018

(54) METHOD AND APPARATUS FOR MANAGING THE DISPLAY OF MESSAGES OF A GROUP CHAT

(71) Applicant: Tencent Technology (Shenzhen) Company Limited, Shenzhen (CN)

(72) Inventors: Yi Shan, Shenzhen (CN); Baihan Cai, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/702,563

(22) Filed: Sep. 12, 2017

(65) Prior Publication Data

US 2018/0006986 A1 Jan. 4, 2018

Related U.S. Application Data

(63) Continuation of application No. 15/190,005, filed on Jun. 22, 2016, now Pat. No. 9,794,206, which is a (Continued)

(30) Foreign Application Priority Data

Apr. 30, 2014 (CN) .......................... 2014 1 0180845

(51) Int. Cl.
*G06F 15/16* (2006.01)
*H04L 12/58* (2006.01)
(Continued)

(52) U.S. Cl.
CPC .............. *H04L 51/14* (2013.01); *G06Q 10/00* (2013.01); *H04L 51/04* (2013.01); *H04L 51/046* (2013.01); *H04L 65/403* (2013.01)

(58) Field of Classification Search
CPC ....... H04L 65/403; H04L 51/04; H04L 51/14; H04L 51/046
(Continued)

(56) References Cited

U.S. PATENT DOCUMENTS 8,055,721 B2 11/2011 O'Sullivan et al.
8,769,418 B2 7/2014 Lee et al.
(Continued)

FOREIGN PATENT DOCUMENTS

CN 1908877 A 2/2007
CN 101025671 A 8/2007
(Continued)

OTHER PUBLICATIONS

Tencent Technology, ISRWO, PCT/CN2015/070166, dated Apr. 3, 2015, 9 pgs.
(Continued)

*Primary Examiner* — Bharat N Barot
(74) *Attorney, Agent, or Firm* — Morgan, Lewis & Bockius LLP

(57) ABSTRACT

A method includes: upon opening a target communication window, displaying a first subset of communication items target communication window, without concurrently displaying a second and a third subset of communication items in the target communication window, wherein: the first, second, and third subsets of communication items have been received after last closure of the target communication window, and the first subset is received after the second subset, and the second subset is received after the third subset; in response to receiving a second user request to
(Continued)

display earlier received communication items and in accordance with a determination that the second user request meets predefined list rollback criteria: ceasing to display the first subset of communication items in the target communication window; and displaying the third subset of communication items in the target communication window, without first displaying the second subset of communication items in the target communication window.

20 Claims, 4 Drawing Sheets

Related U.S. Application Data continuation of application No. PCT/CN2015/070166, filed on Jan. 6, 2015.

(51) Int. Cl.
*G06Q 10/00* (2012.01)
*H04L 29/06* (2006.01)

(58) Field of Classification Search
USPC .......... 709/202–206; 715/733, 753, 758–759
See application file for complete search history.

(56) References Cited

U.S. PATENT DOCUMENTS

| | | | |
|---|---|---|---|
| 9,794,206 B2* | 10/2017 | Shan | ............ H04L 51/14 |
| 2002/0023128 A1 | 2/2002 | Matsumoto et al. | |
| 2007/0130258 A1 | 6/2007 | Almberg | |
| 2010/0005402 A1 | 1/2010 | George et al. | |
| 2012/0191796 A1 | 7/2012 | Griffin et al. | |
| 2013/0069969 A1 | 3/2013 | Chang et al. | |
| 2013/0212202 A1 | 8/2013 | Lee | |
| 2015/0163182 A1 | 6/2015 | Chandrasekaran | |
| 2015/0249717 A1 | 9/2015 | Mencke | |

FOREIGN PATENT DOCUMENTS

| | | |
|---|---|---|
| CN | 101060502 A | 10/2007 |
| CN | 103414628 A | 11/2013 |
| CN | 103744592 A | 4/2014 |
| CN | 104090714 A | 10/2014 |
| EP | 2677414 A2 | 12/2013 |

OTHER PUBLICATIONS

Tencent Technology, IPRP, PCT/CN2015/070166, dated Nov. 1, 2016, 6 pgs.

* cited by examiner

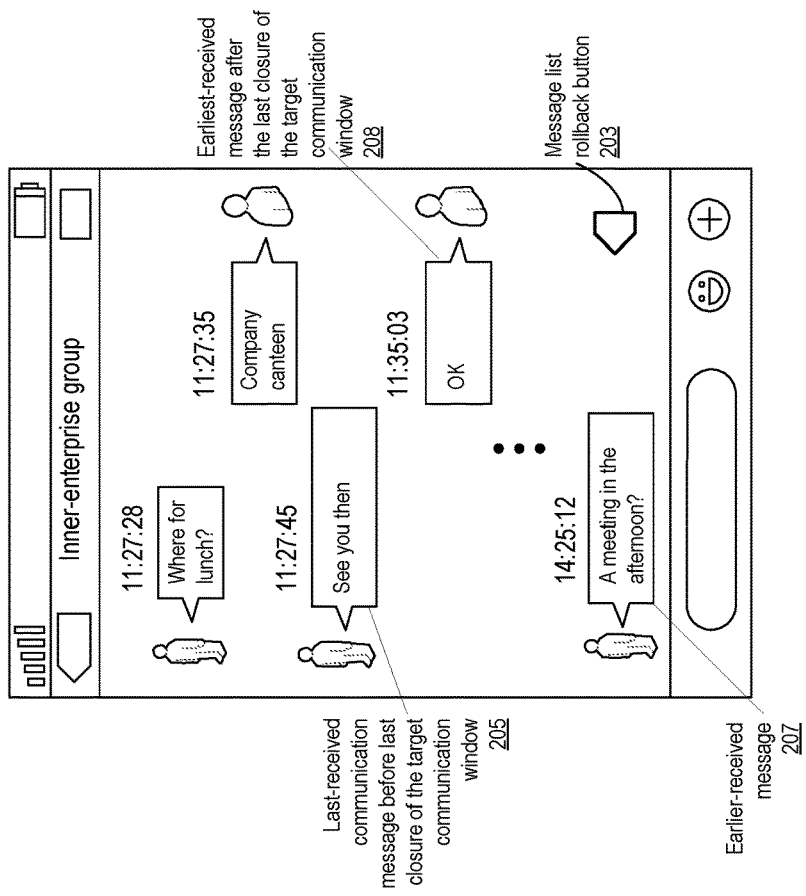
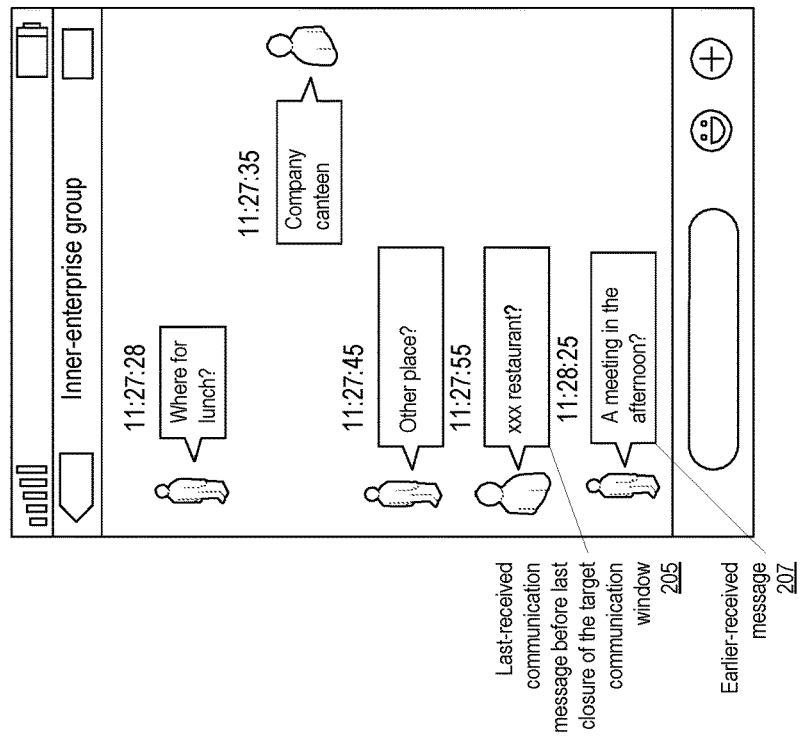
FIG. 2D
FIG. 2C

METHOD AND APPARATUS FOR MANAGING THE DISPLAY OF MESSAGES OF A GROUP CHAT

RELATED APPLICATIONS

This application a continuation of U.S. patent application Ser. No. 15/190,005, entitled "METHOD AND APPARATUS FOR MANAGING THE DISPLAY OF MESSAGES OF A GROUP CHAT", filed on Jun. 22, 2016, which is a continuation application of PCT Patent Application No. PCT/CN2015/070166, entitled "METHOD AND APPARATUS FOR MANAGING THE DISPLAY OF MESSAGES OF A GROUP CHAT" filed on Jan. 6, 2015, which claims priority to Chinese Patent Application No. 201410180845.3, entitled "METHOD AND APPARATUS FOR DISPLAYING A MESSAGE LIST" filed on Apr. 30, 2014, all of which are incorporated by reference in their entirety.

TECHNICAL FIELD

The disclosed implementations relate generally to the field of computer technologies, and in particular, to method and an apparatus for managing the display of messages of a group chat.

BACKGROUND

With the rapid development of internet technologies, instant messaging based on the Internet brings people a lot of conveniences, and also becomes a main trend of the present network businesses. Instant messaging applications are convenient for people to communicate online and share such information as pictures, videos and the like anytime and anywhere.

Generally, when a user uses the instant messaging application to chat, a communication window corresponding to a certain friend or group needs to be opened. Communication messages sent by each of the communication parties (including the user) may all be displayed on the communication window in a form of message list, and may be displayed from top to bottom in time sequence, wherein an earlier message is displayed in an upper position. When the user opens the communication window, if the message list contains many communication messages, generally the communication window preferentially displays the last-received communication message. In a process of implementing the present application, the inventor finds the prior art has at least the following problems. After the user closes a certain communication window, if a large number of new communication messages corresponding to the communication window are received; when the user opens the communication window again, the communication window displays the last-received communication message. At this time, if the user wants to read the earlier-received communication messages from the communication window closed last time, the user needs to scroll up the message list from the bottom (the position of the latest communication message), and reads the communication messages one by one to look up the corresponding communication message so as to acquire the corresponding information, which causes a quite low information acquisition efficiency.

SUMMARY

The above deficiencies and other problems (e.g., bad user experience) associated with the conventional approach of browsing messages are reduced or eliminated by the present application disclosed below. In some embodiments, the present application is implemented in a computing device (e.g., a PC, a tablet or a smartphone) that has one or more processors, memory and one or more modules, programs or sets of instructions stored in the memory for performing multiple functions. Instructions for performing these functions may be included in a computer program product configured for execution by one or more processors.

In accordance with some embodiments of the present application, a method for computer-implemented method for managing the display of messages on a screen of a computing device is performed at the computing device having one or more processors and memory for storing program modules to be executed by the processors. The method includes: receiving a first user request to open a target communication window on the screen, wherein the target communication window corresponds to a group chat among multiple users of an online messaging application; in response to the first user request, opening the target communication window and displaying a first set of messages associated with the group chat in the target communication window, wherein the first set of messages were received by the computing device after last closure of the target communication window and includes a recently-received message; receiving a second user request to access an earlier-received message after the last closure of the target communication window; and in response to the second user request, replacing the display of the first set of messages with the display of a second set of messages in the target communication window, wherein the second set of messages were received by the computing device after the last closure of the target communication window and includes the earlier-received message. In accordance with some embodiments of the present application, a computing device includes one or more processors; memory; and one or program modules stored in the memory for performing the method mentioned above. In accordance with some embodiments of the present application, a non-transitory computer readable storage medium stores one or more program modules configured for execution by a computing device that includes one or more processors and memory for performing the method mentioned above.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

In order to illustrate the technical solutions in the embodiments of the present application more clearly, the accompanying drawings used in the descriptions of the embodiments will be described simply hereinafter. Apparently, the accompanying drawings described hereinafter are merely some embodiments of the present application. Those having ordinary skills in the art may also figure out other accompanying drawings according to the accompanying drawings without creative work.

FIGS. 2A-2D are schematic diagrams of interface display according to the embodiments of the present application;

DETAILED DESCRIPTION

To make the object, technical solution and advantages of the present application more clear, the present application is further described in detail with reference to the embodiments hereinafter.

Embodiment 1

Figure 1:
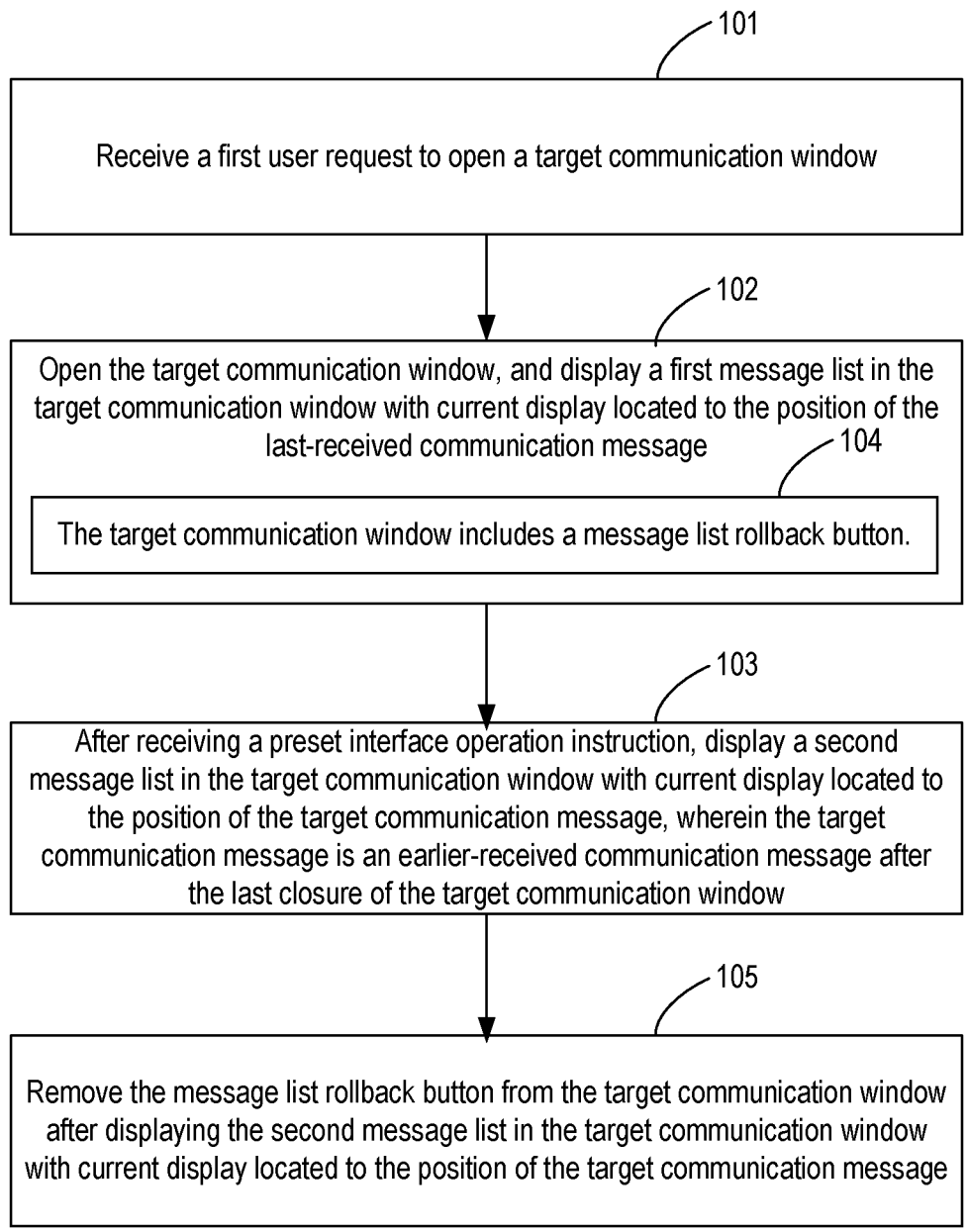
FIG. 1 is a flow chart of a method for managing the display of messages of a group chat according to embodiments of the present application.

Embodiment of this application provides a method for managing the display of messages of a group chat on the screen of a computing device, e.g., a smartphone, a tablet computer, a laptop, a desktop, etc. As shown in FIG. 1, the process flow of the method may comprise the following steps.

Step 101: Receive a first user request to open a target communication window. In some embodiments, the target communication window corresponds to a group chat among multiple users of an online messaging application running on the computing device.

Step 102: In response to the first user request, open the target communication window, and display a first message list in the target communication window with current display located to the position of a recently-received communication message (e.g., the last-received communication message before the opening of the target communication window). In some embodiments, the first message list corresponds to a first set of messages associated with the group chat in the target communication window and the first set of messages were received by the computing device after last closure of the target communication window and includes a recently-received message.

Step 103: After receiving a second user request (e.g., a preset interface operation instruction), display a second message list in the target communication window with current display located to the position of the target communication message, wherein the target communication message is one of a second set of messages received by the computing device after the last closure of the target communication window.

In the embodiment of the present application, the computing device receives the first user request to open the target communication window, opens the target communication window, and displays the message list in the target communication window with current display located to the position of a recently-received communication message (e.g., the last-received communication message before the opening of the target communication window) for display; after receiving a second user request (e.g., a preset interface operation instruction), displays the message list in the target communication window with current display located to the position of the target communication message, wherein the target communication message is an earlier-received communication message after the last closure of the target communication window. In this way, the current display of the message list may move directly to the position of an earlier-received communication message after the last closure of the target communication window through the preset interface operation instruction, and the user does not need to scroll the message list to look up, so that the information acquisition efficiency may be improved.

Embodiment 2

The embodiment of the present application provides a method for managing the display of a set of messages associated with a group chat, wherein a main body for performing the method may be a computing device installed with a communication application (such as an instant messaging application), such as a computer, a mobile phone, a tablet computer and the like. The process flow as shown in FIG. 1 will be described in detail hereinafter with reference to the detailed description of the embodiments, wherein the contents may be as follows.

Step 101: Receive a first user request to open a target communication window, wherein the communication window is a window for browsing and entering the communication message in the communication application (e.g., an instant messaging application). Each communication window may be associated with a group chat involving one or more target accounts. The target account is an account that communicates with a local account of the computing device via the group chat, for example, the communication window may either be a communication window corresponding to the account of a certain friend, or be a communication window corresponding to a certain group. In the communication window, a message list may be arranged for displaying the communication messages sent by the local account and the target account. The communication contents may be displayed from top to bottom in time sequence, and an earlier message is displayed in an upper position. An entry frame may also be arranged on the communication window for entering the communication contents. The target communication window may be a communication window corresponding to any target account.

During implementation, when a user needs to communicate with a certain friend or group, or needs to view the communication message of a certain friend or group, the user may open the communication application firstly, and then click in a communication account list (namely a friend list) to select a corresponding account or group. At this time, a first user request to open the target communication window may be triggered and generated, wherein this target communication window is the communication window corresponding to the account or group selected by the user. Alternatively, after the computing device receives the communication message sent by a certain account, a message prompt icon of the account may be displayed in a certain designated position (such as the bottom right corner) on a screen; and the user may click or double-click the message prompt icon so as to trigger and generate the first user request to open the target communication window.

Step 102: Open the target communication window, and display a first message list in the target communication window with current display located to the position of a recently-received communication message (e.g., the last-received communication message before the opening of the target communication window). In some embodiments, the target communication window includes a message list rollback button (104, FIG. 1).

Figure 2A:
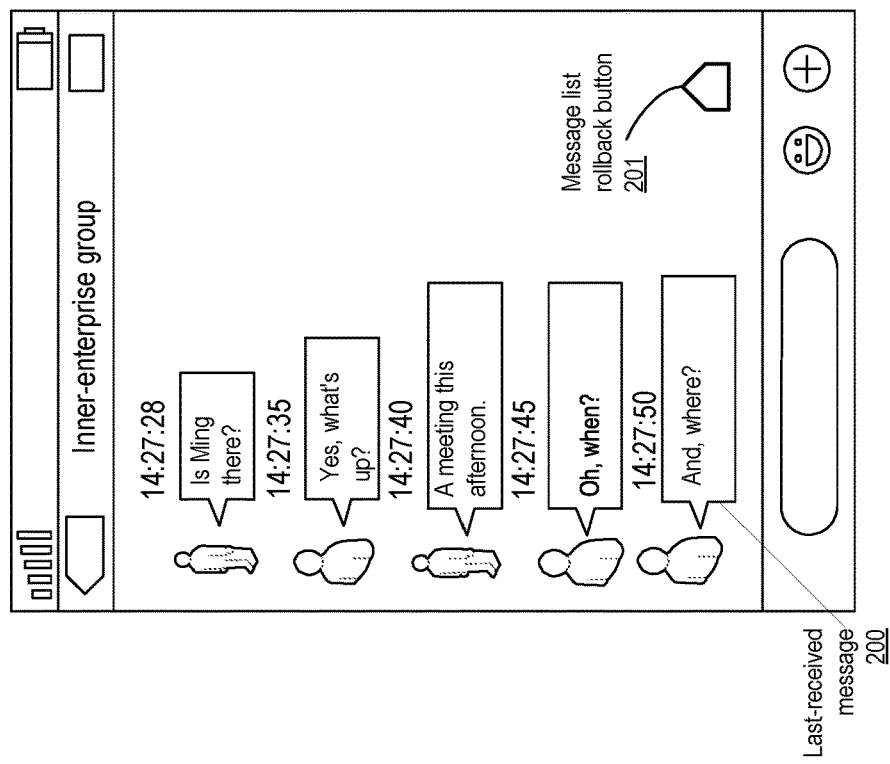

During implementation, after a communication application of the computing device receives the foregoing user request to open the target communication window, the target communication window may be triggered and displayed. As shown in FIG. 2A, using a mobile phone for example, the target communication window is a communication window of a certain group chat. A message list may be displayed in the target communication window. The communication messages sent by each communication party are displayed in the message list from top to bottom in time sequence. The communication message at the bottom of the message list is the last-received communication message 200 in the message list. For the message list shown in FIG. 2A, assuming that there are a large number of communication messages received after the user closed the target communication window last time (e.g., the communication messages sent by other users in the group have been quite a lot after the user closed the target communication window), the communication messages in the message list currently displayed are usually a few most recently-received communication messages. In order to find an earlier-received communication message after the last closure of the target communication window, the user may scroll up from the bottom of the message list to read the communication messages one by one. But as shown in FIG. 2A, a message list rollback button 201 is displayed in the communication window as a shortcut to the earlier-received communication message. The message list rollback button 201 may be an arrow type towards the upward direction. The message list rollback button 201 is used for triggering and rolling back the message list to the position of an earlier-received communication message after the last closure of the target communication window. Specific operating process is described in detail in the rest contents.

Optionally, in order to improve the utilization ratio of the message list rollback button 201, certain display conditions may be set for the message list rollback button 201. Several feasible processing manners for displaying the message list rollback button 201 are described hereinafter based on different display conditions.

Manner I: Display the message list rollback button when the total number of the newly-received communication messages after the last closure of the target communication window exceeds a preset number threshold. During implementation, when setting this number threshold, the number threshold may be set to be greater than or equal to the maximum number of the communication messages that can be displayed in the message list at the same time, which is namely the number of the communication messages that can be displayed in the message list at the same time if the content of each piece of communication message does not exceed one line. When the number of the newly-received communication messages after the last closure of the target communication window exceeds the number threshold, the earlier-received communication messages may not be displayed in the target communication window when opening the target communication window this time. At this moment, the message list rollback button may be displayed for quickly rolling back the message list.

Manner II: Display the message list rollback button when the corresponding display length of the newly-received communication messages in the message list exceeds a preset length threshold after the last closure of the target communication window. During implementation, when setting this length threshold, the length threshold may be set to be greater than or equal to the maximum length of the communication messages that can be displayed in the message list at the same time, which is namely the length of the region in the message list for displaying the message list. Through the foregoing setting on the length threshold, if the display length of the newly-received communication messages in the message list after the last closure of the target communication window exceeds the length threshold, then the earlier-received communication messages may not be displayed in the target communication window when opening the target communication window this time. At this moment, the message list rollback button may be displayed for quickly rolling back the message list.

Step 103: After receiving a second user request (e.g., a preset interface operation instruction), display the message list in the target communication window with current display located to the position of the target communication message, wherein the target communication message is an earlier-received communication message after the last closure of the target communication window. In some embodiments, the earlier-received message is the first message received by the computing device after the last closure of the target communication window. In some other embodiments, the earlier-received message is the first of a group of messages all received within a predefined time interval after the last closure of the target communication window. For example, the earlier-received message may be preceded by at least another message received by the computing device after the last closure of the target communication window and there is at least a predefined time gap between the other message and the earlier-received message. A group chat may last for a long time and cover many different topics. As will be described below, heuristic rules may be used for identifying a group of messages within the group chat, which covers a specific topic. For example, the temporal proximity of messages within the group, common keywords appearing within the group of messages, time gaps between the group of messages and other messages and identities of users related to the group of messages can be used for defining the group of messages that are related to the same topic. The interface operation instruction is an instruction triggered by the interface operation of the user. The preset interface operation instruction may be a designated interface operation instruction for triggering the message list to rollback, and may be freely set according to the actual demands. For example, the preset interface operation instruction may either be a click instruction for clicking a certain position, a certain icon or a certain button, or an instruction triggered by long-pressing any position of the screen, and the like.

During implementation, after the user performs a designated operation to trigger the preset interface operation instruction, the communication application may perform the rollback operation on the message list in the target communication window to display the message list in the target communication window with current display located to the position of the first updated communication message (namely the foregoing target communication message) after the last closure of the target communication window. When the message list is displayed on this position, one or more communication messages before this target communication message, which are namely one or more communication messages latest updated after the last closure of the target communication window, may be displayed. Several feasible processing manners of step 103 are given hereinafter based on different display conditions.

Manner I: For the foregoing situation of displaying the message list rollback button, display the message list in the target communication window with current display located to the position of the target communication message when receiving the click instruction corresponding to the message list rollback button.

Figure 2B:
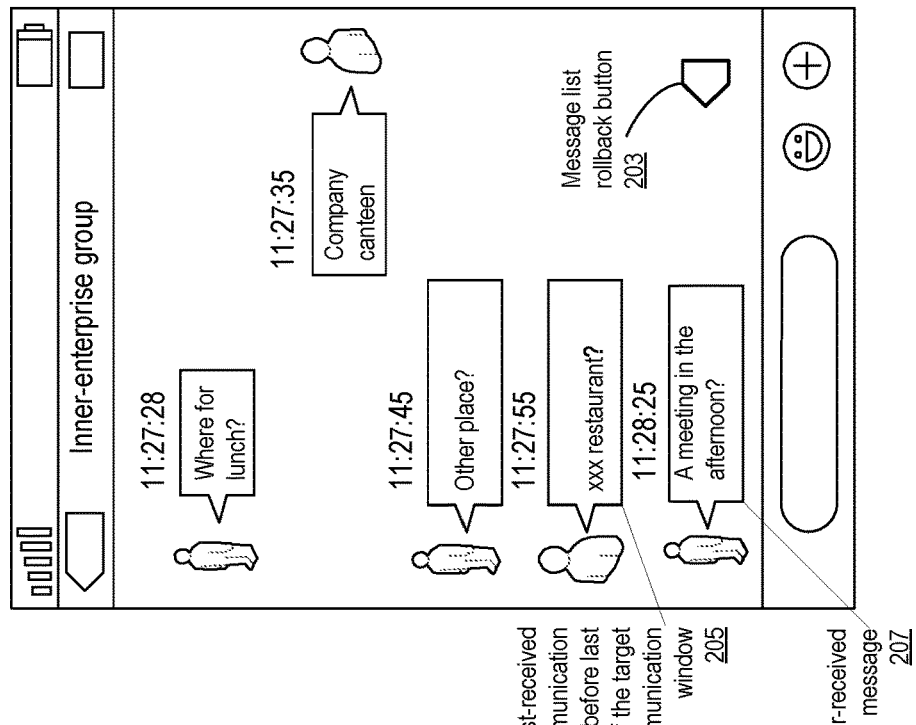

During implementation, after the user opens the target communication window, if the user wants to read from the first updated communication message after the last closure of the target communication window, the user may click the message list rollback button 201 displayed on the target communication window through a manner like point contact with a mouse or finger. At this moment, the message list may be triggered to move to the position of an earlier-received communication message after the last closure of the target communication window. In some embodiments, a certain deletion mechanism may be set for the foregoing message list rollback button 201. For example, the message list rollback button 201 may be removed (105, FIG. 1) from the window after displaying the message list in the target communication window with current display located to the position of the target communication message. During implementation, after the user opens the target communication window, if the message list is scrolled to the position of the foregoing target communication message through a manner of scrolling the message list, some changes may be performed on the icon of the message list rollback button 203 firstly at this moment. As shown in FIG. 2B, the arrow direction of the icon may be pointed to the target communication message on the left. In this example, the earlier-received message 207 is the first message received by the mobile device after the last closure of the target communication window because the message 205 is the last-received communication message before the last closure of the target communication window. After lasting for certain duration (such as 2 seconds), the message list rollback button 203 may be removed from the target communication window, as shown in FIG. 2C. Or, if the current display of the message list moves to the position of the foregoing target communication message through a manner of triggering the foregoing preset interface operation instruction by the user, some changes may be made on the icon of the message list rollback button firstly at this moment. As shown in FIG. 2B, the arrow direction of the icon may be pointed to the target communication message on the left; after lasting for certain duration (such as 2 seconds), the message list rollback button may be removed as shown in FIG. 2C.

FIG. 2D depicts another embodiment of the present application in which the message list rollback button 203 points to an earlier-received message 207 that is not the first message received after the last closure of the target communication window. In this example, the first three messages are related to the topic of where to have lunch. But before the arrival of the message 208, the user of the mobile device closes the target communication window. As a result, the message 208 becomes the earliest-received message after the last closure of the target communication window. Referring back to FIG. 2A, the topic of the messages shown therein is a meeting, not the lunch. Therefore, the user may be misled if a user selection of the message list rollback button 201 triggers the display of the message 208 at the bottom of the screen shown in FIG. 2D. In this case, the computing device may invoke certain heuristic rules described above to identify that the message 207 is the first of a group of messages related to the same topic about the meeting. Note that there is a significant time gap between the message 207 and the message 208 in FIG. 2D, which may be used for clustering different messages within a group chat into different groups related to different topics. Note that FIG. 2D is for illustrative purpose. In real life, there could be a number of messages preceding the message 207 such that the earliest-received message 208 may not be shown in the screen at all. In some embodiments, the screen may display another message list rollback button (not shown in FIG. 2D) such that the user can quickly access another group of message on a different topic discussed by members of the group chat before the meeting topic. In other words, the user can keep pressing the message list rollback button to browse various topics covered the group members.

Manner II: when receiving the interface operation instruction triggered by a touch signal satisfying the preset conditions, display the message list in the target communication window with current display located to the position of the target communication message.

The preset conditions may be conditions for restraining such features as time duration or sliding trajectory and the like of the touch signal. During implementation, the preset condition may be set so that the time duration reaches a preset value (such as 2 seconds). In this way, after the user opens the target communication window, if the user wants to read from the first updated communication message after the last closure of the target communication window, then the user may be in point contact with any position of the target communication window with fingers. When the lasting duration of the touch signal produced by point contact reaches the preset duration threshold, the message list may be triggered to move to the position of an earlier-received communication message after the last closure of the target communication window. Or, the preset condition may be set as satisfying the preset sliding trajectory features, for example, the sliding trajectory forms a closed graph and the like. In this way, after the user opens the target communication window, if the user wants to read from the first updated communication message after the last closure of the target communication window, the user may be in point contact with any position of the target communication window with fingers and perform a corresponding sliding operation. When the sliding trajectory of the touch signal produced satisfies the preset sliding trajectory features, the message list may be triggered to move to the position of an earlier-received communication message after the last closure of the target communication window.

In the embodiment of the present application, a computing device receives the first user request to open the target communication window, opens the target communication window, and displays the message list in the target communication window with current display located to the position of a recently-received communication message (e.g., the last-received communication message before the opening of the target communication window); after receiving a second user request (e.g., a preset interface operation instruction), displays the message list in the target communication window with current display located to the position of the target communication message, wherein the target communication message is an earlier-received communication message after the last closure of the target communication window. In this way, the current display of the message list may move directly to the position of an earlier-received communication message after the last closure of the target communication window through the preset interface operation instruction, and the user does not need to scroll the message list to look up, so that the information acquisition efficiency may be improved.

Embodiment 3

Figure 3:
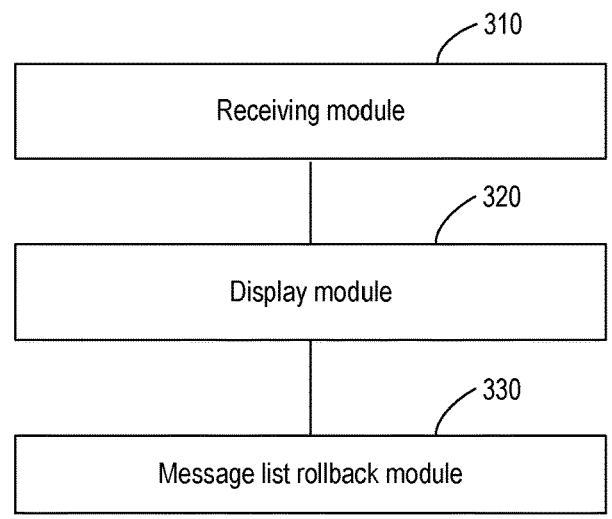
FIG. 3 is a structural block diagram of an apparatus for displaying a message list according to the embodiments of the present application.

Based on the same technology concepts, the embodiment of the present application further provides an apparatus for displaying a message list. As shown in FIG. 3, the apparatus comprises: a receiving module 310, configured to receive a first user request to open a target communication window; a display module 320, configured to display the target communication window, and display a first message list in the target communication window with current display located to the position of a recently-received communication message (e.g., the last-received communication message before the opening of the target communication window); and a message list rollback module 330, configured to display a second message list in the target communication window with current display located to the position of the target communication message after receiving a second user request (e.g., a preset interface operation instruction), wherein the target communication message is an earlier-received communication message after the last closure of the target communication window.

Optionally, the display module 320 is further configured to display a message list rollback button; the message list rollback module 330 is configured to display the message list in the target communication window with current display located to the position of the target communication message when receiving a click instruction corresponding to the message list rollback button.

Optionally, the display module 320 is further configured to: display the message list rollback button if the number of the newly-received communication messages after the last closure of the target communication window exceeds a preset number threshold; or, display the message list rollback button if the corresponding display length of the newly-received communication messages in the message list exceeds a preset length threshold after the last closure of the target communication window.

Optionally, the display module 320 is further configured to: cancel the message list rollback button when displaying the message list in the target communication window with current display located to the position of the target communication message.

Optionally, the message list rollback module 330 is further configured to display the message list in the target communication window with current display located to the position of the target communication message when receiving the interface operation instruction triggered by a touch signal satisfying the preset conditions.

In the embodiment of the present application, a computing device receives the first user request to open the target communication window, opens the target communication window, and display the message list in the target communication window with current display located to the position of a recently-received communication message (e.g., the last-received communication message before the opening of the target communication window); after receiving a second user request (e.g., a preset interface operation instruction), display the message list in the target communication window with current display located to the position of the target communication message, wherein the target communication message is an earlier-received communication message after the last closure of the target communication window. In this way, the current display of the message list may move directly to the position of an earlier-received communication message after the last closure of the target communication window through the preset interface operation instruction, and the user does not need to scroll the message list to look up, so that the information acquisition efficiency may be improved.

Embodiment 4

Figure 4:
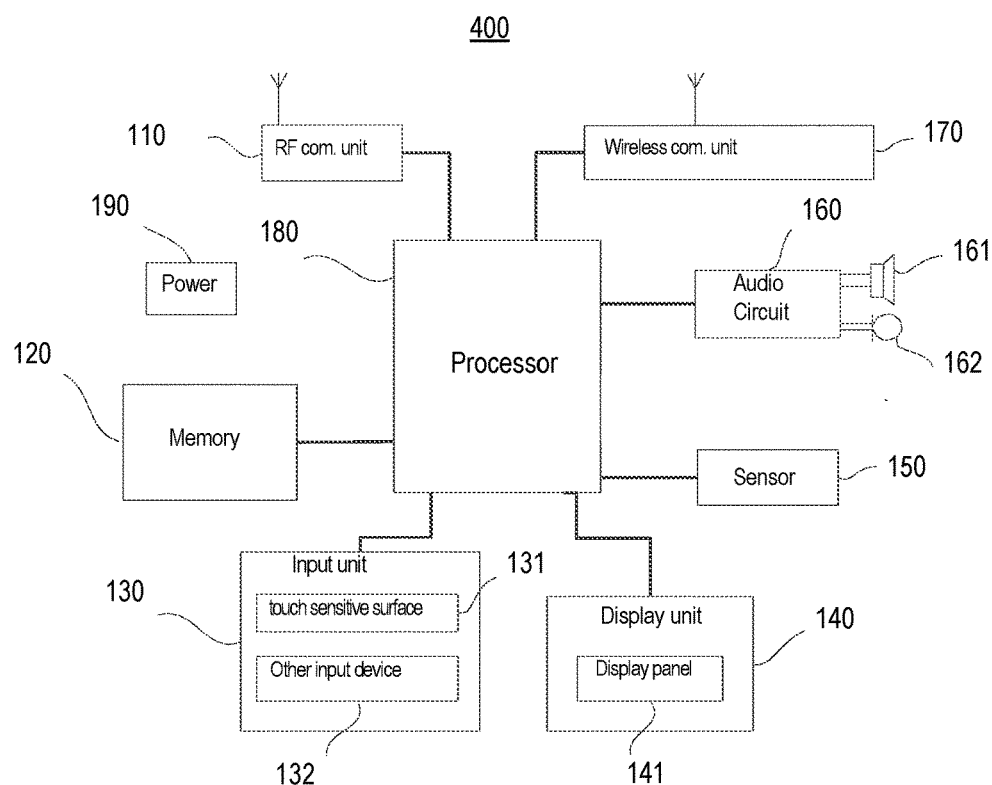
FIG. 4 is a structural block diagram of a computing device according to the embodiments of the present application.

FIG. 4 shows a structural block diagram of a computing device related to in the embodiment of the present application. The computing device may be applied to implement the method for managing the display of a set of messages associated with a group chat according to the foregoing embodiments. To be specific, the computing device 400 may comprise such parts as a communication unit 110, a memory 120 comprising one or more than one non-transitory computer readable storage medium, an input unit 130, a display unit 140, a sensor 150, an audio circuit 160, a WIFI (Wireless Fidelity, wireless fidelity) module 170, a processor comprising one or more than one processing core, a power supply 190 and the like. Those skilled in the art may understand that the computing device structure shown in the figure, does not define the computing device; the computing device may comprise parts more or fewer than that shown in the figure, or comprise combinations of some parts, or different part arrangements. The communication unit 110 may be configured to receive and send signals during a process of information transceiving or talking. The communication unit 110 may be such network communication equipment as an RF (Radio Frequency, radio frequency) circuit, a router, a modem and the like. Specially, when the communication unit 110 is an RF circuit, the RF circuit after receives downlink information from a base station, sends the information over to one or more than one processor 180 for processing. Moreover, the RF circuit sends uplink data to the base station. Usually, the RF circuit serving as the communication unit comprises, but is not limited to an antenna, at least one amplifier, a tuner, one or more oscillators, a subscriber identity module (SIM) card, a transceiver, a couple, an LNA (Low Noise Amplifier, low noise amplifier), a duplexer and the like. In addition, the communication unit 110 may further be communicated with the network or other devices through radio communications. Any of communication standard or protocol may be used for radio communication, which comprises, but not limited to GSM (Global System of Mobile communication, global system of mobile communication), GPRS (General Packet Radio Service, general packet radio service), CDMA (Code Division Multiple Access, code division multiple address), WCDMA (Wideband Code Division Multiple Access, wideband code division multiple address), LTE (Long Term Evolution, long term evolution), an email, SMS (Short Messaging Service, short messaging service) and the like. The memory 120 may be configured to store software programs and modules. The processor 180 carries out various function applications and data processing through the software programs and modules stored in the memory 120. The memory 120 may mainly comprise a program storage area and a data storage area, wherein the program storage area may store the applications (such as sound playing function, image playing function and the like) required by an operating system, at least one function and the like. The data storage area may store the data (such as audio data, telephone directory and the like) created according to the use of the computing device 800, and the like. In addition, the memory 120 may comprises a high speed random access memory, and may further comprises a non-volatile memory, for example, at least one disk memory device, a flash memory device or other volatile solid state memory devices. Accordingly, the memory 120 may further comprise a memory controller so as to provide access of the processor 180 and the input unit 130 to the memory 120. The input unit 130 may be configured to receive inputted number or character information, and produce keyboard, mouse, joystick, optical or trackball signal input related to user settings and function control. Preferably, the input unit 130 may comprise a touch-sensitive surface 131 and other input devices 132. The touch-sensitive surface 131 is also called a touch display screen or a touchpad, which may collect a touch operation of the user on or near the touch-sensitive surface (for example, operation of the user on the touch-sensitive surface 131 or near the touch-sensitive surface 131 by using any proper object or accessory like fingers, stylus and the like), and drive a corresponding connecting device according to a preset program. Optionally, the touch-sensitive surface 131 may comprise two parts which include a touch detecting device and a touch controller. The touch detecting device detects a touch position and direction of the user and a signal brought by the touch operation, and transmits the signal to the touch controller. The touch controller receives touch information from the touch detecting device, and converts the touch information into contact coordinates, and then transmits the contact coordinates to the processor 180. Moreover, the touch controller can receive and carry out an instruction sent by the processor 180. Furthermore, the touch-sensitive surface 131 may be implemented in various types such as resistor type, capacitance type, infrared rays, surface acoustic waves and the like. Except the touch-sensitive surface, the input unit 130 may further comprise other input devices 132. Preferably, the other input devices 132 may comprise, but not limited to one or more of a physical keyboard, virtual (function) keys (such as volume control keys, switch keys etc.), trackballs, mouse, joysticks and the like. The display unit 140 may be configured to display the information provided by the user or the information provided to the user as well as various graphical user interfaces of the computing device 400, wherein the graphical user interfaces may be composed of graphs, texts, icons, videos and any combination thereof. The display unit 140 may comprise a display panel 141. Optionally, the display panel 141 may be configured by adopting such forms as LCD (Liquid Crystal Display, liquid crystal display), OLED (Organic Light-Emitting Diode, organic light emitting diode) and the like. Further, the touch-sensitive surface 131 may cover the display panel 141. When the touch-sensitive surface 131 detects the touch operation on or near the touch-sensitive surface, the touch-sensitive surface 131 transmits the touch operation to the processor 180 so as to determine the type of a touch event. Afterwards, the processor 180 provides corresponding visual output on the display panel 141 according to the type of the touch event. Although in FIG. 4, the touch-sensitive surface 131 and the display panel 141 are served as two independent parts to realize input and output functions, in some embodiments, the touch-sensitive surface 131 and the display panel 141 may be integrated to realize the input and output functions.

The computing device 400 may further comprise at least a sensor 150, for example, a light sensor, a motion sensor and other sensors. The light sensor may comprise an ambient light sensor and a proximity sensor, wherein the ambient light sensor may adjust the brightness of the display panel 141 according to the lighting of the ambient light, and the proximity sensor may close the display panel 141 and/or backlight when the computing device 400 approaches the ear. As one type of motion sensors, a gravity acceleration sensor may detect the acceleration in each direction (usually in three axial directions), may detect the value and direction of the gravity in a static state, may be used for an application used for recognizing a mobile phone gesture (such as switching between a horizontal screen and a vertical screen, switching related to a game, and calibration on the posture of a magnetometer), vibration identifying functions (such as for pedometer and striking) and the like, in the touch screen computing device. Furthermore, a gyroscope, a barometer, a humidity meter, a thermometer, an infrared sensor and other sensors may be integrated into the touch screen computing device 400, to which explanation are not repeated herein.

The audio circuit 160, a loud speaker 161 and a microphone 162 may provide an audio interface between the user and the computing device 400. The audio circuit 160 may transmit an electric signal converted from the received audio data to the loud speaker 161, and the loud speaker 161 converts the electric signal into a sound signal and outputs. On the other hand, the microphone 162 converts the collected sound signal into an electric signal. The audio circuit 160 receives the electric signal and converts the electric signal into audio data, and then outputs the audio data to the processor 180 to be processed so as to send the audio data to, for example, another computing device through the RF circuit 110 or output the audio data to the memory 120 for further processing. The audio circuit 160 may further possibly comprise an ear plug jack so as to provide communication between a peripheral earphone and the computing device 400. In order to realize radio communication, a radio communication unit 170 may be configured on the computing device, wherein the radio communication unit 170 may be a WIFI module. WIFI belongs to a short distance radio transmission technology. The computing device 400 may help the user receive and send an Email, browse web pages and access streaming media and the like through the radio communication unit 170. The radio communication unit provides radio wideband internet access for the user. Although the radio communication unit 170 is shown in the FIG., it is understandable that the radio communication unit does not belong to a required component of the computing device 400, and may be completely omitted as required without changing the scope of the present application.

The processor 180 is the control center of the computing device 400, which utilizes various interfaces and lines to connect with each part of the entire mobile phone, and carries out various functions of the computing device 800, and processes data through operating or carrying out the software program and/or module stored in the memory 120 and calling in the data stored in the memory 120, thus performing entire monitoring on the mobile phone. Optionally, the processor 180 may comprise one or more processing cores. Preferably, the processor 180 may integrate an application processor and a modulation-demodulation processor, wherein the application processor is mainly used for the operating system, the user interface and applications and the like, and the modulation-demodulation processor is mainly used for radio communication. It is understandable that the foregoing modulation-demodulation processor may also not be integrated into the processor 180.

The computing device 800 further comprises a power supply 190 (such as a battery) that supplies power to each part. Preferably, the power supply may be logically connected with the processor 180 through a power supply management system, thus realizing to management of power charging, power discharging and power consumption and the like through the power supply management system. The power supply 190 may further comprise any component such as one or more direct current or alternating current power supplies, a recharging system, a power failure detection circuit, a power supply convertor or inverter, a power supply status indicator and the like.

Although it is not shown in the FIG. 4, the computing device 400 may further comprise a camera, a blue tooth module and the like, which will not be repeatedly described herein.

In the embodiment, the computing device further comprises a memory and one or more than one program, wherein one or more than one program is stored in the memory, and one or more than one processor is configured to carry out an instruction included in one or more than one program for performing the method according to the embodiment of the present application, comprising receiving the first user request to open the target communication window; displaying the target communication window, and locating a message list on the target communication window to the position of the last-received communication message; and locating the message list on the target communication window to the position of the target communication message after receiving a second user request (e.g., a preset interface operation instruction), wherein the target communication message is an earlier-received communication message after the last closure of the target communication window.

Optionally, the method further comprises the steps of: displaying a message list rollback button, wherein the locating the message list on the target communication window to the position of the target communication message after receiving a second user request (e.g., a preset interface operation instruction) comprises the step of: locating the message list on the target communication window to the position of the target communication message when receiving a click instruction corresponding to the message list rollback button.

Optionally, displaying the message list rollback button comprises the steps of: displaying the message list rollback button if the number of the newly-received communication messages after the last closure of the target communication window exceeds a preset number threshold; or, displaying the message list rollback button if the corresponding display length of the newly-received communication messages in the message list exceeds a preset length threshold after the last closure of the target communication window.

Optionally, the method further comprises the step of: cancelling the message list rollback button when displaying the message list in the target communication window with current display located to the position of the target communication message. Optionally, displaying the message list in the target communication window with current display located to the position of the target communication message after receiving a second user request (e.g., a preset interface operation instruction) comprises the step of: displaying the message list in the target communication window with current display located to the position of the target communication message when receiving the interface operation instruction triggered by a touch signal satisfying the preset conditions.

In the embodiment of the present application, a computing device receives the first user request to open the target communication window, opens the target communication window, and displays the message list in the target communication window with current display located to the position of a recently-received communication message (e.g., the last-received communication message before the opening of the target communication window); after receiving a second user request (e.g., a preset interface operation instruction), displays the message list in the target communication window with current display located to the position of the target communication message, wherein the target communication message is an earlier-received communication message after the last closure of the target communication window. In this way, the current display of the message list may move directly to the position of an earlier-received communication message after the last closure of the target communication window through the preset interface operation instruction, and the user does not need to scroll the message list to look up, so that the information acquisition efficiency may be improved.

It should be noted that the apparatus for displaying a message list according to the foregoing embodiments while displaying the message list is illustrated only according to the division of each functional module above-mentioned; in practice, the foregoing function distribution is completed by different functional modules according to demands; that is, an internal structure of the apparatus is divided into different functional modules, so as to accomplish all or part of the functions described above. Moreover, the apparatus for displaying a message list provided in the foregoing embodiments and the embodiments of the method for managing the display of messages of a group chat belong to the same concept, and details of the specific implementation process of the apparatus can be seen in the embodiments of the method, which will not be described any further herein.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present application. First ranking criteria and second ranking criteria are both ranking criteria, but they are not the same ranking criteria.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A computer-implemented method of managing display of communication items in a target communication window of a computing device, the method comprising:
   at the computing device having one or more processors and memory for storing program modules to be executed by the processors:
      receiving a first user request to open the target communication window on a display screen, wherein the target communication window is configured to display a sequentially ordered listing of communication items;
      in response to receiving the first user request:
         opening the target communication window; and
         upon opening the target communication window, displaying a first subset of communication items from the sequentially ordered listing of communication items in the target communication window, without concurrently displaying a second subset of communication items and a third subset of communication items from the sequentially ordered listing of communication items in the target communication window, wherein:
            the first, second, and third subsets of communication items have been received by the computing device after last closure of the target communication window, and
            the first subset of communications have been received after the second subset of communication items, and
            the second subset of communication items have been received after the third subset of communication items;
      while displaying the first subset of communication items from the sequentially ordered listing of communication items in the target communication window, without concurrently displaying the second subset of communication items and the third subset of communication items from the sequentially ordered listing of communication items in the target communication window, detecting a second user request to display earlier received communication items; and
      in response to receiving the second user request to display earlier received communication items and in accordance with a determination that the second user request meets predefined list rollback criteria:
         ceasing to display the first subset of communication items in the target communication window; and
         displaying the third subset of communication items in the target communication window, without first displaying the second subset of communication items in the target communication window.

2. The method of claim 1, wherein the first subset of communication items include a last-received communication item among a group of communication items received after the last closure of the target communication window, and the third subset of communication items include a first-received communication item among the group of communication items received after the last closure of the target communication window.

3. The method of claim 1, including:
   when displaying the third subset of communication items in the target communication window, concurrently displaying one or more communication items that are received prior to the last closure of the target communication window.

4. The method of claim 3, including:
   in response to receiving the second user request to display earlier received communication items, identifying the one or more communication items that are received prior to the last closure of the target communication window based on content of the third subset of communication items and content of the one or more communication items that are received prior to the last closure of the target communication window.

5. The method of claim 1, including:
   in response to receiving the first user request:
      upon opening the target communication window, displaying a list rollback affordance with the first subset of communication items in the target communication window.

6. The method of claim 5, wherein the predefined list rollback criteria require that the second user request includes a user input that activates the list rollback affordance.

7. The method of claim 6, including:
   in response to receiving the second user request to display earlier received communication items and in accordance with a determination that the second user request meets predefined list rollback criteria, ceasing to display the list rollback affordance after the third subset of communication items are displayed in the target communication window.

8. A computing device, comprising:
   one or more processors; and
   memory storing instructions, the instructions, when executed by the one or more processors, cause the processors to perform operations for managing display of communication items in a target communication window, the operations comprising:
      receiving a first user request to open the target communication window on a display screen, wherein the target communication window is configured to display a sequentially ordered listing of communication items;
      in response to receiving the first user request:
         opening the target communication window; and upon opening the target communication window, displaying a first subset of communication items from the sequentially ordered listing of communication items in the target communication window, without concurrently displaying a second subset of communication items and a third subset of communication items from the sequentially ordered listing of communication items in the target communication window, wherein:
- the first, second, and third subsets of communication items have been received by the computing device after last closure of the target communication window, and
- the first subset of communications have been received after the second subset of communication items, and
- the second subset of communication items have been received after the third subset of communication items;

while displaying the first subset of communication items from the sequentially ordered listing of communication items in the target communication window, without concurrently displaying the second subset of communication items and the third subset of communication items from the sequentially ordered listing of communication items in the target communication window, detecting a second user request to display earlier received communication items; and in response to receiving the second user request to display earlier received communication items and in accordance with a determination that the second user request meets predefined list rollback criteria:
- ceasing to display the first subset of communication items in the target communication window; and
- displaying the third subset of communication items in the target communication window, without first displaying the second subset of communication items in the target communication window.

9. The computing device of claim 8, wherein the first subset of communication items include a last-received communication item among a group of communication items received after the last closure of the target communication window, and the third subset of communication items include a first-received communication item among the group of communication items received after the last closure of the target communication window.

10. The computing device of claim 8, wherein the operations include:
when displaying the third subset of communication items in the target communication window, concurrently displaying one or more communication items that are received prior to the last closure of the target communication window.

11. The computing device of claim 10, wherein the operations include:
in response to receiving the second user request to display earlier received communication items, identifying the one or more communication items that are received prior to the last closure of the target communication window based on content of the third subset of communication items and content of the one or more communication items that are received prior to the last closure of the target communication window.

12. The computing device of claim 8, wherein the operations include:
in response to receiving the first user request:
upon opening the target communication window, displaying a list rollback affordance with the first subset of communication items in the target communication window.

13. The computing device of claim 12, wherein the predefined list rollback criteria require that the second user request includes a user input that activates the list rollback affordance.

14. The computing device of claim 13, wherein the operations include:
in response to receiving the second user request to display earlier received communication items and in accordance with a determination that the second user request meets predefined list rollback criteria, ceasing to display the list rollback affordance after the third subset of communication items are displayed in the target communication window.

15. A non-transitory computer-readable storage medium storing instructions, the instructions, when executed by one or more processors of a computing device, cause the processors to perform operations for managing display of communication items in a target communication window, the operations comprising:
receiving a first user request to open the target communication window on a display screen, wherein the target communication window is configured to display a sequentially ordered listing of communication items;
in response to receiving the first user request:
opening the target communication window; and
upon opening the target communication window, displaying a first subset of communication items from the sequentially ordered listing of communication items in the target communication window, without concurrently displaying a second subset of communication items and a third subset of communication items from the sequentially ordered listing of communication items in the target communication window, wherein:
- the first, second, and third subsets of communication items have been received by the computing device after last closure of the target communication window, and
- the first subset of communications have been received after the second subset of communication items, and
- the second subset of communication items have been received after the third subset of communication items;

while displaying the first subset of communication items from the sequentially ordered listing of communication items in the target communication window, without concurrently displaying the second subset of communication items and the third subset of communication items from the sequentially ordered listing of communication items in the target communication window, detecting a second user request to display earlier received communication items; and in response to receiving the second user request to display earlier received communication items and in accordance with a determination that the second user request meets predefined list rollback criteria:
- ceasing to display the first subset of communication items in the target communication window; and
- displaying the third subset of communication items in the target communication window, without first displaying the second subset of communication items in the target communication window.

16. The non-transitory computer-readable storage medium of claim 15, wherein the first subset of communication items include a last-received communication item among a group of communication items received after the last closure of the target communication window, and the third subset of communication items include a first-received communication item among the group of communication items received after the last closure of the target communication window.

17. The non-transitory computer-readable storage medium of claim 15, wherein the operations include:
when displaying the third subset of communication items in the target communication window, concurrently displaying one or more communication items that are received prior to the last closure of the target communication window.

18. The non-transitory computer-readable storage medium of claim 17, wherein the operations include:
in response to receiving the second user request to display earlier received communication items, identifying the one or more communication items that are received prior to the last closure of the target communication window based on content of the third subset of communication items and content of the one or more communication items that are received prior to the last closure of the target communication window.

19. The non-transitory computer-readable storage medium of claim 15, wherein the operations include:
in response to receiving the first user request:
upon opening the target communication window, displaying a list rollback affordance with the first subset of communication items in the target communication window.

20. The non-transitory computer-readable storage medium of claim 19, wherein the predefined list rollback criteria require that the second user request includes a user input that activates the list rollback affordance.

* * * * *